C. A. LOHMAN.
LUMBER SORTING DEVICE.
APPLICATION FILED NOV. 14, 1916.
1,277,326.
Patented Aug. 27, 1918.
2 SHEETS—SHEET 2.
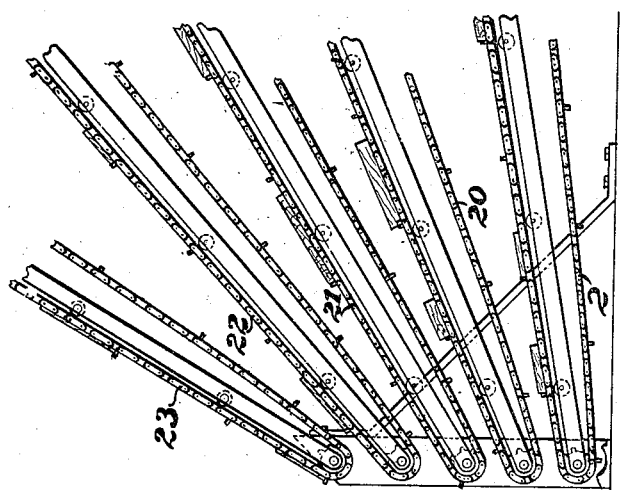
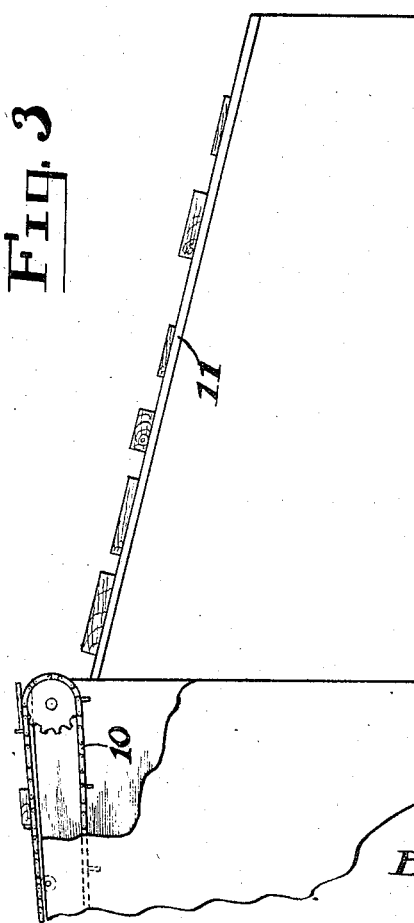
Fig. 3
Inventor
Carl A. Lohman
By Henry L. Reynolds
Attorney

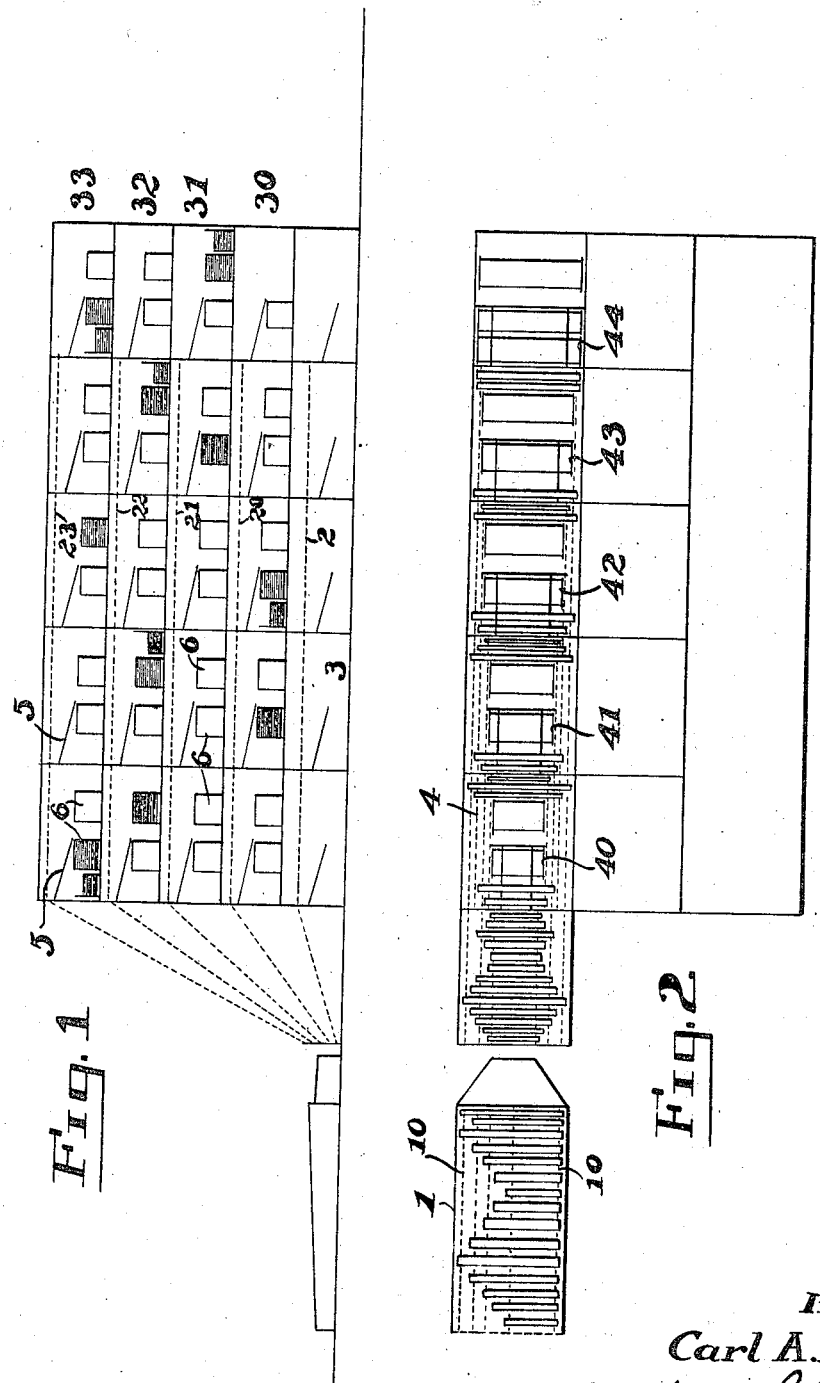

UNITED STATES PATENT OFFICE.

CARL A. LOHMAN, OF SEATTLE, WASHINGTON.

LUMBER-SORTING DEVICE.

1,277,326.　　　　Specification of Letters Patent.　　Patented Aug. 27, 1918.

Application filed November 14, 1916. Serial No. 131,209.

*To all whom it may concern:*

Be it known that I, CARL A. LOHMAN, a citizen of the United States, and resident of the city of Seattle, county of King, and State of Washington, have invented certain new and useful Improvements in Lumber-Sorting Devices, of which the following is a specification.

My invention relates to improvements in devices for sorting and stacking lumber and comprises certain novel parts and combinations of parts which will be hereinafter described and then particularly pointed out in the claims.

The object of my invention is to provide means whereby the lumber may be sorted by machinery as to its length and the lumber left in such convenient shape that it may be easily sorted by hand in accordance with quality or character.

In the accompanying drawings I have illustrated a form of apparatus which is that now preferred by me.

Figure 1 is a side elevation of a diagrammatical character showing the general arrangement of the apparatus which I use in sorting lumber in accordance with my invention.

Fig. 2 is a plan view of one set of such apparatus.

Fig. 3 is a sectional elevation showing the parts employed at and adjacent the main accumulation fall.

In the drawings 1 represents a table over which the lumber is conveyed by a series of conveyer chains, the same being represented by dotted lines 10. Lumber is delivered by these chains, dropped upon the main accumulation fall 11, the same being placed at an angle so that the lumber will, either of itself, slide down this incline for a considerable distance, or may be easily moved by hand down the same. At a short distance from the lower end of this incline are a series of conveyer chains 2, 20, 21, 22, and 23. These chains are separated vertically by a sufficient distance to permit of the passage of lumber between each chain and the one next above. The number of these conveyer chains to be employed will depend upon the system employed in the sorting. It is designed that each chain receive one thickness of lumber.

Under a certain plan of operation, more than one thickness might be handled by one or more of these conveyers. In fact, the lowermost chain 2 is ordinarily intended for the reception of stock intended for use in the yard without drying, dimension stuff and odd thicknesses. The other chains are to receive, say the chain 20, two-inch stock, the chain 21, one inch and a half stock, the chain 22, one inch and a quarter stock, and chain 23, stock an inch or less in thickness.

Each chain passes in an overhead position the length of a sorting and stacking floor. These sorting and stacking floors are preferably arranged in superposed position, as is shown in Fig. 1. The lowermost floor 3 is the floor which receives the yard stock and dimension stuff. The next floor 30 receives the material from the conveyer chain 20. Floors 31, 32 and 33, each receiving material respectively from the conveyer chains 21, 22 and 23. The position of these conveyer chains is indicated in Fig. 1 by the dotted lines bearing numbers corresponding with those given to the corresponding conveyer chains shown in Fig. 3.

Each of these conveyer chains has supporting guides or flooring placed so as to support the lumber as it is being conveyed. The lumber slides upon this flooring 4 with the length of the boards transverse the direction of their movement. These supporting ways or floors 4 are provided with openings 40, 41, 42, 43, and 44, the width of these being varied in accordance with the different lengths of the lumber being sorted and being of such width that each will be slightly wider than the length of lumber to be deposited at this point. The smaller hole will be the one through which the shortest length of lumber is being deposited, this being the first in the line, and the succeeding holes being of increasingly greater width. Below each of these holes is placed an accumulation fall or sorting table 5, upon which the lumber deposited through said hole is received. The lumber will collect upon this floor until it is removed therefrom by hand, at which time it may be finally sorted as to quality or character.

I have shown in Fig. 1 a series of piles of lumber 6. These piles of lumber are each made up of boards of the same length and grade. It is also intended that these piles be built upon slight supports or dollies so that they may be readily removed to a dry kiln or wherever desired. As the means for doing this do not form a part of my present invention I have not herein shown or described the same.

By the use of the above device it is evident that the lumber may be sorted by its length automatically and left in such position that sorting in accordance to quality, or character of wood, may be conveniently done by hand. It will not be necessary for hand sorters to be provided for each accumulation fall. Two men can do this work most conveniently and these may go from one accumulation fall to another in order, sorting the lumber which has accumulated, and in this way be able to care for a large number of such stations.

In doing this work it is an easy matter to have one pile for one grade of lumber and another pile for another grade, and also to have a third pile adjacent, upon which may be placed boards of a different kind of wood, or having any special characteristic by reason of which it is desirable to separate them from the rest.

What I claim as my invention:

1. A lumber sorting device comprising lumber supporting guides coöperating to convey the lumber transversely of its length, said lumber supporting guides being elevated and having openings of successively increasing size to thereby sort the lumber by length, said openings being separated to provide lumber sorting and handling spaces beneath the guides and between the successive openings and elevated sorting tables beneath the several openings upon which the lumber is received and over the face of which the lumber may move.

2. A lumber sorting mechanism comprising a plurality of superimposed sorting floors, overhead lumber conveyers extending lengthwise of each of said floors, said conveyers comprising supporting elements having openings of successively increasing size to thereby sort the lumber by length by the precipitation of said lumber through the openings, said openings being spaced at intervals along said floors, the height of the several floors above one another and the distance between said openings being such as to provide lumber sorting and handling spaces for each of the said openings within which workmen may work and an elevated sorting table beneath each of said openings and in each of said spaces.

Signed at Seattle, Washington, this 6th day of November, 1916.

CARL A. LOHMAN.

Copies of this patent may be obtained for five cents each, by addressing the "Commissioner of Patents, Washington, D. C."